(12) United States Patent
Minow et al.

(10) Patent No.: US 12,363,108 B2
(45) Date of Patent: Jul. 15, 2025

(54) AUTHORIZATION OF A USER TERMINAL USING AN AUDIO SIGNAL

(71) Applicant: Deutsche Telekom AG, Bonn (DE)

(72) Inventors: Jascha Minow, Bensheim (DE); Carl Jahn, Wiesbaden (DE); Said El Mallouki, St. Goar (DE); Martin Michael Platschek, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 203 days.

(21) Appl. No.: 18/003,502

(22) PCT Filed: Jun. 28, 2021

(86) PCT No.: PCT/EP2021/067671
§ 371 (c)(1),
(2) Date: Dec. 28, 2022

(87) PCT Pub. No.: WO2022/002841
PCT Pub. Date: Jan. 6, 2022

(65) Prior Publication Data
US 2023/0239292 A1 Jul. 27, 2023

(30) Foreign Application Priority Data
Jun. 29, 2020 (EP) .................................. 20182907

(51) Int. Cl.
*H04L 9/40* (2022.01)
(52) U.S. Cl.
CPC ........ *H04L 63/0861* (2013.01); *H04L 63/083* (2013.01); *H04L 63/0876* (2013.01); *H04L 2463/082* (2013.01)

(58) Field of Classification Search
CPC ... G06F 21/44; G06F 3/167; H04L 2463/082; H04L 63/083; H04L 63/0861; H04L 63/0876
See application file for complete search history.

(56) References Cited

U.S. PATENT DOCUMENTS

| | | | |
|---|---|---|---|
| 2004/0215968 A1* | 10/2004 | Rodwell | H04M 1/67 713/186 |
| 2011/0314530 A1* | 12/2011 | Donaldson | H04L 9/3231 726/7 |

(Continued)

FOREIGN PATENT DOCUMENTS

| | | |
|---|---|---|
| WO | WO 2014063363 A1 | 5/2014 |
| WO | WO 2018004935 A1 | 1/2018 |

OTHER PUBLICATIONS

Das, Borisov, & Caesar, "Do you hear what i hear? Fingerprinting smart devices through embedded acoustic components", . In Proceedings of the ACM Conference on Computer and Communications Security, pp. 441-452 (ACM 2014) (Year: 2014).*

*Primary Examiner* — Theodore C Parsons
(74) *Attorney, Agent, or Firm* — LEYDIG, VOIT & MAYER, LTD.

(57) ABSTRACT

A user terminal includes a computer unit for executing algorithms and for controlling the user terminal and a first communication interface for establishing a data connection with a server in a communication network. A method for authorizing the user terminal in connection with using a service operated on the server in the communication network includes: generating an audio signal characteristic of the user terminal in relation to an impending use of the service; acquiring, by the user terminal, the characteristic audio signal; transmitting the characteristic audio signal to the server via the data connection; authenticating, by the server, via one or more signature keys stored in a database, (Continued)

1 voice command
2 audio stream
3 signal
4 obtain audio ID
5 extract audio ID
6 validate audio ID
7 grant/deny access
8 report
9 report
10 communication system
11 user
12 user terminal
13 microphone
14 processor
15 loudspeaker
16 communication interface
17 internal communication network
18 data connection
19 Internet
20 server the transmitted characteristic audio signal; and based on successful authentication, authorizing, by the server, the user terminal for the service.

17 Claims, 1 Drawing Sheet

(56) References Cited

U.S. PATENT DOCUMENTS

| | | | |
|---|---|---|---|
| 2012/0252411 | A1 | 10/2012 | Johnsgard et al. |
| 2014/0172430 | A1* | 6/2014 | Rutherford ............. G06F 3/167 704/273 |
| 2018/0007060 | A1* | 1/2018 | Leblang ................ H04L 63/107 |
| 2019/0103115 | A1* | 4/2019 | Lesso ....................... G10L 25/51 |
| 2019/0182176 | A1* | 6/2019 | Niewczas ............... G10L 17/24 |
| 2019/0238535 | A1* | 8/2019 | Lew ......................... G10L 17/04 |
| 2019/0362064 | A1* | 11/2019 | Zhang ..................... G06F 21/35 |
| 2023/0239292 | A1* | 7/2023 | Minow ................... G06F 21/44 726/4 |

* cited by examiner

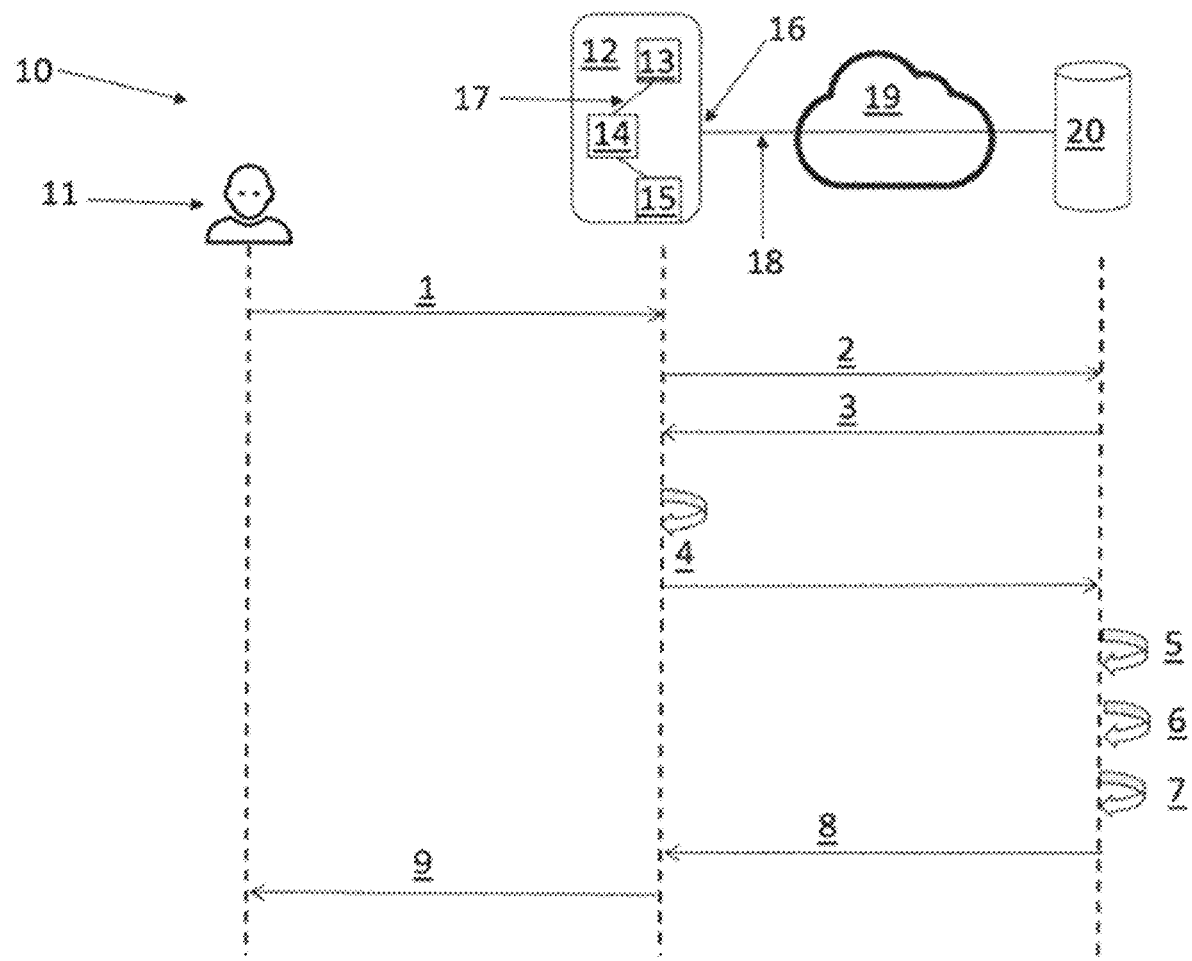

AUTHORIZATION OF A USER TERMINAL USING AN AUDIO SIGNAL

CROSS-REFERENCE TO PRIOR APPLICATIONS

This application is a U.S. National Phase application under 35 U.S.C. § 371 of International Application No. PCT/EP2021/067671, filed on Jun. 28, 2021, and claims benefit to European Patent Application No. EP 20182907.4, filed on Jun. 29, 2020. The International Application was published in German on Jan. 6, 2022 as WO 2022/002841 A1 under PCT Article 21(2).

FIELD

The invention relates to a method, a terminal device of a user and a communication system for authorizing the user terminal when using a service on the internet

BACKGROUND

User terminals, i.e. in particular smartphones, tablets, but also intelligent loudspeakers, are increasingly linked to one another by networks. This offers various advantages: on the one hand, by the networking of their terminals, users can communicate with one another in many ways, even in larger groups, and, on the other hand, user terminals can be connected to powerful servers, in particular via the internet, whereby the servers are able to offer an increased level of computing power for processes and/or also to provide a variety of services.

If a provider provides a service in this way, the provider must ensure, for reasons of cost and/or security, that only authorized terminals can use the service provided on a platform. This is done not only to protect the platform against unauthorized access, but also makes it possible to identify devices and provide this tailored service. The services that can be provided by such a service are of many types. For example, sports results can be retrieved, a weather forecast can be announced and/or music from a streaming provider can be played back.

Conventionally, this problem is solved by identifying and authorizing the user terminals, also referred to below as "user equipment" (UE), on the platform by their hardware ID and/or an access token. However, both solutions are very maintenance-intensive, since the token and the associated security certificates must be kept continually secure and up to date.

SUMMARY

In an exemplary embodiment, the present invention provides a method for authorizing a user terminal in connection with using a service in a communication network. The user terminal comprises a computer unit for executing algorithms and for controlling the user terminal and a first communication interface for establishing a data connection with a server in the communication network, wherein the service is operated on the server. The method comprises: generating an audio signal characteristic of the user terminal in relation to an impending use of the service; acquiring, by the user terminal, the characteristic audio signal; transmitting the characteristic audio signal to the server via the data connection; authenticating, by the server, via one or more signature keys stored in a database, the transmitted characteristic audio signal; and based on successful authentication, authorizing, by the server, the user terminal for the service.

BRIEF DESCRIPTION OF THE DRAWING

Subject matter of the present disclosure will be described in even greater detail below based on the exemplary FIGURE. All features described and/or illustrated herein can be used alone or combined in different combinations. The features and advantages of various embodiments will become apparent by reading the following detailed description with reference to the attached drawing, which illustrates the following:

FIG. 1 shows the data processing flow of a method according to the invention together with a communication system according to the invention.

DETAILED DESCRIPTION

Exemplary embodiments of the invention provide a method, a user terminal and a communication system for authorizing a user terminal, which reduces the complexity of the authorization, in particular for the provider of a service on the internet.

Features of various aspects of the invention described below, or of various exemplary embodiments, can be combined with one another insofar as this is not explicitly ruled out or absolutely precluded from a technical standpoint.

According to the invention, a method for authorizing a user terminal in the use of a service in a communication network, in particular the internet, is provided, wherein the method comprises:

a user terminal having a processor for executing algorithms and for controlling the user terminal and a first communication interface for establishing a data connection with a server in the communication network, a server, wherein the server provides the service for authorized user terminals;

wherein the method comprises the following steps:

generating an audio signal characteristic of the user terminal when use of the service is impending;

the audio signal characteristic of the user terminal to a certain extent represents an audio ID. Such an audio ID is to be considered as analogous to a fingerprint. The audio ID is also assigned to the user terminal, ideally uniquely assigned like a fingerprint to a person. These audio signals can be provided in the audible, but also in the non-audible frequency range. If the audio signals are provided in the non-audible frequency range, it is advantageously not apparent that the user terminal is generating and possibly playing its audio ID. The audio ID can be generated in an automated manner at each start-up of the user terminal, but in any case when the service provided on the server is to be used.

acquiring the characteristic audio signal by the user terminal;

the processor therefore knows that the audio ID is generated at a specific time. This makes it possible for the user terminal, controlled by the processor, to also detect the audio ID in a targeted manner and not to have to run continuously in a detection-readiness mode. The detected audio ID can be temporarily stored in a memory, in particular in a security area of the user terminal, for further processing.

transmitting the characteristic audio signal to the server via the data connection;

the processor controls the transmission of the audio ID to the server by forwarding the corresponding data of the audio ID via the internal communication system of the user terminal to its communication interface and instructing it to transmit. The server receives the audio ID via its own communication interface or a communication interface assigned to it, which is also referred to below as a second communication interface.

determining by the server whether the audio signal being transmitted by the user terminal matches the generated audio signal of the user terminal (authentication);

an advantage is that only authorized user terminals are granted access to the service. Here the user terminal is first authenticated. The authentication usually precedes the authorization. Here the audio ID serves as a signature of the transmitted audio signal, which is checked for authenticity with the aid of a private key. The check is therefore aimed at evaluating in a directed manner whether the transmitted audio signal is in exactly the state as during its creation and also whether it originates from exactly the expected user terminal or whether it has been changed during transmission and comes from another user terminal. This is in principle analogous to a checksum comparison. It would also be possible to determine by the server whether the audio signal being transmitted by the user terminal matches a stored and authorized audio signal in a database, in particular which user terminals are "expected" may also be stored in such a database. For this purpose, the transmitted audio ID is compared with other audio IDs in a database for a match. The other audio IDs are authorized audio IDs, so that when the server finds a match, it is determined that the transmitted audio ID is also authorized. The database in the context of this invention therefore preferably has signature keys. In a further embodiment, such a database can also have the audio ID/signatures themselves;

the user terminal being enabled by the server for service when there is a positive match of the audio signals (authorization).

By enablement of the user terminal it is granted access to the service. Preferably, enablement always holds only for as long as the established data connection is maintained. For example, the data connection can be established via a handshake method. If the user terminal is switched off or the data connection is interrupted, where the device identifies again with its audio ID. Since this expediently takes place in an automated manner and without interaction on the part of a user, it will nevertheless be comfortable for the user, wherein at the same time by the regular, renewed authorization a high security standard is ensured for the provider of the service.

The method thus enables a comfortable and secure authorization of the user terminal on the basis of an audio signal. Another advantage is that a plurality of algorithms exist which can be implemented on the server in order to compare audio signals with one another. In this case, certain parameters can be transferred to these algorithms, which specify by how much two different audio signals may differ from one another in order to be identified as identical audio signals. It should be noted here that there are many circumstances which can lead to the audio signal experiencing small distortions, which would lead to the signal no longer being successfully authenticated if excessively stringent criteria are applied to matching of the transmitted audio signal to the stored audio signal.

One idea of the invention can be seen in the fact that in particular audio signals of a user are not used for authorizing or authentication, but rather audio signals generated by the user terminal itself. These can be, for example, characteristic noises of the processor, a fan or the like. In other words, operating noises. Every device has individual operating noises, which is due, for example, to the fact that such user terminals are never assembled 100% identically, for example, even during assembly (variations in the torque of the screws) or also because the devices are in different environments, which can generate unique frequency vibrations. In addition, it is possible for the user terminals to actively generate their own uniquely identifiable noises.

The characteristic audio signal is expediently generated in an analog manner by operating noises of the user terminal and/or digitally by an app running on the user terminal.

The operating noises characteristic of the user terminal may, for example, already be those which are generated by the user terminal as such, without further measures. Each user terminal ultimately has different operating noises during operation, also due to its individual assembly. Although these different operating noises are often not perceived at all or only very faintly by the human ear, they can nevertheless be recorded by corresponding internal microphones of the user terminal. In addition, it is possible to artificially generate characteristic operating noises, for example by storing a code on the processor, whereby it activates the loudspeaker of the user terminal to generate very specific characteristic frequencies. Another possibility is to first digitally generate the audio ID by an app running on the user terminal. Among other things, this has the advantage that such an app can be downloaded in a targeted manner before the user if he wishes to participate in the audio ID identification method. Another advantage is that such an app can be updated in order to close security gaps, for example. The user can also be prompted to use the app if the operating noises are not suitable for checking the audio ID. This can be the case, for example, when the characteristic audio ID of two different users is very similar.

The characteristic audio signal generated by the app is preferably generated on the basis of a password and/or in an automated manner on the basis of a fixed key.

It is thus advantageously made possible for the user of the user terminal to be able to generate another characteristic audio signal in order to log into the service with, for example, a new audio ID. On the basis of the password that the user of the app transfers, an algorithm is started which on the basis of this password generates an audio ID. A different audio ID follows from another password. However, the app can also be given a fixed key which serves as a basis for this algorithm. In this case, the method is even more comfortable for the user.

The characteristic audio signal is preferably augmented with the audio signal of the app that is based on the password.

This has the advantage that the information content of the audio ID transmitted to the server is increased. Increased information content generally allows further data analysis or data processing. For example, the augmentation of the characteristic audio signal can help ensure further distinguishing features between different audio IDs.

According to one embodiment, the audio signal based on the password is added on a defined harmonic.

This has the advantage that the additionally added audio signal can be differentiated from the already existing audio signal. In this regard, it is advantageous to inform the server on which frequencies or which harmonics the added audio signal is provided.

A multi-factor authentication is preferably carried out with the augmented audio signal. For this purpose, keys are stored for the checksum comparison, in particular in the database, and the audio ID is verified on the basis of a checksum comparison. It is also possible to store the corresponding augmented audio signals on the server in the database so that a comparison or a check can be carried out efficiently. Secure multi-factor authentication makes possible the advantage that, due to higher harmonics in addition to the voice and the audible audio signals on further frequencies, information that is not audible to humans in the form of the audio ID is transmitted as, for example, a personal PIN or a personal password.

The digitally generated characteristic audio signals are expediently played back by a loudspeaker of the user terminal.

This offers the advantage that the digital audio signals can be made audible in order to record them and then transmit them to the server for authentication. Due to the loudspeaker, the analog audio signals can also be made audible, wherein this is possibly not necessary at all, since the operating noises of the user terminal itself are present in an audible manner as frequency oscillations of the air. For this purpose, the user terminal preferably has a digital-to-analog converter. Via a digital-to-analog converter, the loudspeakers can be controlled in order to convert the digital audio ID into a corresponding analog frequency signal.

According to one exemplary embodiment, the analog characteristic audio signals are picked up by a microphone of the user terminal.

This offers the advantage that not only the digital audio ID converted into analog signals but also the audio ID originally present in an analog manner can efficiently be made accessible by the microphone to the user terminal for further processing, in particular for forwarding via audio stream to the server. Since the data to the server are preferably transmitted digitally via the data connection, the user terminal also comprises an analog-to-digital converter which converts analog signals into digital signals.

The digital characteristic audio signals are preferably sent directly from the application to the first communication interface for transmission to the server.

When the digital audio signals are converted into analog signals through the loudspeaker, which are then again recorded by the microphone of the user terminal, a potential security risk is created. By virtue of the audio ID being played back via the loudspeaker, it is possible for a third party to use a microphone unnoticed to record the audio ID, even when it is not audible, and for this data to then be used in turn to log into the service on non-authorized user terminals or to authorize them. However, it is now not necessary at all to convert the digital audio ID into an analog audio ID and then to convert it back into a digital audio ID. The processor can advantageously forward the digital audio ID directly to the communication interface for transmission to the server. In this way, it is made impossible or at least significantly more difficult for a third party to record the audio ID unnoticed with a microphone.

In the absence of a match by the server, a registration process is preferably started or the user terminals are rejected.

This offers the advantage that a manufacturer of the user terminal does not already need to detect the audio ID of the device during production and make it known to the server for inclusion in its database. At least in the case in which the audio ID is generated on the basis of a password via the digital app, this will therefore also not be possible in advance. The registration process now advantageously enables the user of the database to make known the signature keys themselves, so that they can be stored in the database and used for future authentication processes. If the audio ID is not stored in the database and the user also does not perform a registration process, the audio ID and thus access to the service will be rejected, since in this case there is a non-authorized user terminal.

The server expediently extracts the characteristic audio signals from the other audio signals in an audio stream before the determination of the match. If the characteristic audio signals are found within a prespecified frequency range, an algorithm will be able to filter out this specific frequency range and thus separate the characteristic audio signals from other audio signals, such as the normal voice commands of a user during communication with the service. This offers the advantage that a check of the match is possible more easily or is even possible at all.

According to a second aspect of the invention, a user terminal is provided, for example a smartphone, a tablet, a smart watch, an intelligent loudspeaker, etc., for use of a service on a server in a communication network. The communication network can in particular be the internet. The user terminal comprises the following:
  a first communication interface, wherein the communication interface is configured to establish a data connection with a communication network;
  a processor configured to execute algorithms and control the user terminal,
  an audio signal generation unit configured to generate a characteristic audio signal of the user terminal, wherein the processor is configured to forward the characteristic audio signal to the communication interface for transmission to the server;
    the audio signal generation unit can be the user terminal itself or else a known combination of a processor, which generates audio signals initially digitally and then optionally additionally controls a loudspeaker, so that it converts the digital signals into analog frequency oscillations, i.e. tones. In this case, the loudspeaker is an audio signal output unit of the user terminal.

The user terminal preferably has an audio signal acquisition unit. The audio signal acquisition unit is expediently a microphone. This can be the microphone via which the user communicates his voice commands to the service, but it can also be an additionally provided microphone which has been specifically optimized for the frequency range of the characteristic audio signal. Such a microphone especially provided for this purpose can also be attached in the interior of the user terminal; this can be particularly advantageous if the operating noises of the user terminal are used as characteristic audio signals.

A third aspect of the invention provides a communication system for using a service on a server in a communication network, in particular the internet. The communication system is configured to carry out a method according to the invention. The communication system comprises:
  a server, wherein the server provides a service via the communication network;
  a user terminal, wherein the user terminal uses the service on the server and is connected to the server via a data connection;

wherein the server is configured to extract from an audio stream a characteristic audio signal transmitted by the user terminal and to compare to a generated audio signal a transmitted audio signal via signature keys stored in a database, wherein the server is also configured to enable the user terminal for the service in the event of a match.

Advantages of the second and third aspects of the invention include the above-discussed advantages of the first aspect of the invention.

Numerous features of the present invention are explained in detail below based on preferred embodiments. The present disclosure is not thereby limited to the specifically mentioned combinations of features. Rather, the features mentioned here can be combined arbitrarily to form embodiments according to the invention provided this is not expressly excluded below.

FIG. 1 shows the data processing flow of a method according to the invention together with a communication system 10 according to the invention.

A user 11 can communicate with the user terminal 12, in the present case a smartphone 12, via voice commands. The smartphone 12 has a processor 14 which performs calculations and can control a microphone 13 and a loudspeaker 15 and also a communication interface 16. The internal communication between the components of the smartphone 12 is realized by an internal communication network 17 of the smartphone. Via the communication interface 16, the smartphone 12 can establish a data connection 18 via the internet 19 with a server 20, whereby a service for the user 11 is offered on the server 20. Such a service can be, for example, a music streaming service, a weather forecast, a smart home functionality, etc.

The service is to be provided only for smartphones 12 authorized for this purpose. In this context, an authorization process is carried out via an audio ID which can be assigned to the smartphone 12, in a similar way to a fingerprint. This audio ID has audio signals which can include audible or non-audible frequency oscillations. Each smartphone 12 generates such an audio ID either itself and/or via a mobile app. Such an audio ID preferably cannot be changed and is sent during a voice and audio transmission to the service which is operated on the server 20. Via this audio ID, the smartphone 12 is identified and only a valid and genuine audio ID will be accepted by the service. One possible example of such a service that runs on a server is the "Hallo Magenta" platform operated by Telekom.

The authentication via the audio ID enables the use of an even more secure multi-factor authentication, in which information that is not audible to humans is transmitted through encouragement on further frequencies in addition to the voice and the audible audio signals in the form of an audio ID augmented with this information. The audio ID can thus be augmented with audio signals based on a personal PIN or a password.

Each user terminal 12, with access to the service, thus generates a unique audio ID at start-up and/or on request, with which the device can register during the service and thus receive access authorization for future use. The transmission of the audio ID can be transmitted in parallel in addition to actual speech in a common audio stream.

The data flow from FIG. 1 is described below.

1. The user 11 uses his audio ID-capable user terminal 12 to speak a voice command into the microphone 13 of the user terminal 12.
2. The user terminal 12 starts by sending the audio stream to the server 20, wherein the audio stream contains the voice command of the user 11 that is to be processed by the service. The user terminal 12 sends the audio command from the start of the voice input to the end of the voice input. The start and end of the voice input are recognized and a corresponding signal can be sent to the server 20 that voice input has ended.
3. As soon as a voice processing unit of the server 20 detects the end of the voice input of the audio stream, the voice processing unit sends a corresponding signal back to the user terminal 12.
4. Once the user terminal 12 has received the "end-of-speech-input signal" from the server 20, the user terminal 12 calculates or generates the unique audio ID. The audio ID has the device-specific audio signature itself and can additionally also send a unique signature for each voice command to the voice processing unit of the server 20. The audio ID is embedded in the audio stream and sent via the data link 17 to the service on the server 20. The user terminal 12 creates the audio ID and into a unique audio wave enters it together with the "payload" to be transmitted. This unique audio wave is generated individually for each request and can accordingly be different every time for the same user terminal 12 because a variable audio signal is still added to the unique audio ID. The user terminal 12 then provisionally ends the audio streaming of audio to the server 20.
5. The voice processing unit of the server 20 extracts the specific audio ID received by the user terminal 12 after sending the end-of-speech signal.
6. The voice processing unit of the server 20 uses the received audio signal to calculate the validity and integrity of the transmitted audio payload, in particular by checking the audio ID. This ensures that the data have been sent by an authorized user terminal 12 and have not been tampered with.
7. Depending on the result of the check of the audio ID, the server 20 grants the user terminal 12 access to the user terminal 12 or denies access thereto.
8. If access is granted, the service processes the voice command and provides the user terminal 12 with a weather report, for example.
9. The user terminal 12 reads aloud the returned information of the service or displays the response via the screen or loudspeaker of the customer device.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for authorizing a user terminal in connection with using a service in a communication network, the method comprising:
   playing, by a speaker of the user terminal, a characteristic audio signal in a non-audible frequency range that is not audible to a user of the user terminal, wherein the characteristic audio signal is generated in an automated manner at start-up of the user terminal;
   acquiring, by a microphone of the user terminal, the played characteristic audio signal;
   transmitting, by the user terminal, the acquired characteristic audio signal to a server via a data connection;
   authenticating, by the server, via one or more signature keys stored in a database, the transmitted characteristic audio signal; and
   based on successful authentication, authorizing, by the server, the user terminal for the service.

2. The method according to claim 1, wherein the characteristic audio signal is generated in an analog manner based on operating noises of the user terminal and/or digitally by an app running on the user terminal.

3. The method according to claim 1, wherein the characteristic audio signal is generated digitally by an app running on the user terminal; and
   wherein the characteristic audio signal generated by the app is generated on the basis of a password and/or in an automated manner on the basis of a fixed key.

4. The method according to claim 1, wherein the characteristic audio signal is augmented with an audio signal based on a password.

5. The method according to claim 4, wherein the audio signal based on the password is added onto a defined harmonic.

6. The method according to claim 4, wherein multi-factor authentication is performed with the augmented audio signal.

7. The method according to claim 1, wherein the characteristic audio signal is generated digitally by an app running on the user terminal.

8. The method according to claim 1, wherein the characteristic audio signal is generated in an analog manner based on operating noises of the user terminal.

9. The method according to claim 1, wherein the characteristic audio signal is generated digitally by an app running on the user terminal; and
   wherein the digitally generated characteristic audio signal is transmitted directly from the app to a communication interface of the user terminal for transmission to the server.

10. The method according to claim 1, wherein, in the absence of successful authentication for a respective characteristic audio signal, a registration process is started or a respective user terminal is rejected.

11. The method according to claim 1, wherein the server extracts the characteristic audio signal from other audio signals in an audio stream before authenticating the user terminal based on the characteristic audio signal.

12. The method according to claim 1, wherein playing of the characteristic audio signal in the non-audible frequency range is not apparent to the user of the user terminal.

13. The method according to claim 1, wherein the characteristic audio signal is generated in an automated manner when the service is to be used.

14. The method according to claim 1, wherein the playing, the acquiring, the transmitting, the authenticating, and the authorizing are carried out without interaction from the user of the user terminal.

15. The method according to claim 1, wherein the characteristic audio signal is generated in an automated manner upon re-establishment of a data connection for using the service.

16. A user terminal for using a service on a server in a communication network, comprising:
   a speaker configured to play a characteristic audio signal of the user terminal in a non-audible frequency range that is not audible to a user of the user terminal, wherein the characteristic audio signal is generated in an automated manner at start-up of the user terminal;
   a microphone configured to acquire the played characteristic audio signal;
   a communication interface configured to transmit the acquired characteristic audio signal to the server and to receive data corresponding to the service from the server after successful authentication of the characteristic audio signal by the server.

17. A communication system for using a service in a communication network, comprising:
   a server configured to provide the service via the communication network; and
   a user terminal configured to use the service, wherein the user terminal is connected to the server via a data connection;
   wherein the user terminal is configured to:
      play, by a speaker of the user terminal, a characteristic audio signal in a non-audible frequency range that is not audible to a user of the user terminal, wherein the characteristic audio signal is generated in an automated manner at start-up of the user terminal;
      acquire, by a microphone of the user terminal, the played characteristic audio signal; and
      transmit the acquired characteristic audio signal to a server via a data connection;
   wherein the server is configured to:
      authenticate, via one or more signature keys stored in a database, the transmitted characteristic audio signal; and
      based on successful authentication, authorize the user terminal for the service.

* * * * *